United States Patent [19]

Ekstrand

[11] 4,115,176
[45] Sep. 19, 1978

[54] LAMINATED PAPER PRODUCT AND A METHOD FOR MANUFACTURING SAID PRODUCT

[75] Inventor: Stig Ekstrand, Lund, Sweden

[73] Assignee: AB Akerlund & Rausing, Lund, Sweden

[21] Appl. No.: 515,521

[22] Filed: Oct. 17, 1974

[30] Foreign Application Priority Data

Oct. 24, 1973 [SE] Sweden .............................. 7314397

[51] Int. Cl.² ...................... B32B 27/10; B32B 31/08; B32B 31/20; B32B 31/30
[52] U.S. Cl. ............... 156/244.25; 156/249; 156/290; 428/195; 428/198
[58] Field of Search ............... 161/146, 148; 156/290, 156/249, 243, 244; 428/198, 195

[56] References Cited

U.S. PATENT DOCUMENTS

| | | | |
|---|---|---|---|
| 2,709,293 | 5/1955 | Schwaderer et al. | 161/148 |
| 3,505,083 | 4/1970 | Schelkorn | 161/148 |
| 3,530,023 | 9/1970 | Schutte et al. | 161/148 |
| 3,539,426 | 11/1970 | Nakai et al. | 156/243 |
| 3,600,250 | 8/1971 | Evans | 156/244 |
| 3,607,987 | 9/1971 | Walton et al. | 156/244 |
| 3,619,816 | 11/1971 | Cowen | 156/290 |
| 3,640,788 | 2/1972 | Flynn | 156/244 |
| 3,674,613 | 7/1972 | Lavigne | 156/290 |

*Primary Examiner*—J. C. Cannon
*Attorney, Agent, or Firm*—Burns, Doane, Swecker & Mathis

[57] ABSTRACT

A laminated paper product having use as a disposable substitute for cloth produced from a layer of paper having a layer of plastic material by so controlling the attachment between the two layers that the resulting laminate is capable of being folded like a soft cloth.

10 Claims, 8 Drawing Figures

LAMINATED PAPER PRODUCT AND A METHOD FOR MANUFACTURING SAID PRODUCT

The present invention relates to a laminated paper product including a layer of a porous paper layer and a layer of a plastic material, polythelene or polypropylene for instance. The product is preferably intended to be used as a tablecloth, a disposable bed-sheet or similar cloth substitute material by aiming at a soft folding of the material. For a man skilled in the art it must however, be obvious that the invention of course also can be used for many other purposes.

The product according to the invention is characterized in that the attachment between the two layers varies, preferably sections with a good attachment between the two layers alternate with sections without attachment between said layers, at the same time as the paper is so porous that no rigid airpockets may be provided between the two layers.

The sections with a good attachment provide preferably a line-formed design. By a web material the lines may be arranged with the length of the material or transverse or diagonal. Straight and/or for instance in sinusoidal form curved lines may hereby be arranged in parallel and at even intervals. Alternatively the sections having a good attachment may however provide a point design with regularly formed points, the total surface of which thereby preferably taking up only a small part of the total surface of the product, 5-50 % for instance.

If a so called tissue-quality i.e. a porous paper quality with a surface weight of 15-50grs/sqm is used it has been proved that you get a product which very softly may be folded over for instance the edge of a table, when it is used as a table-cloth. For such a use preferably polythelene is selected as the material for the plastic layer. On the other hand the product intended to be used as for instance disposable bed-sheets in connection with surgical operations will withstand sterilization. In that case polypropylene or a similar plastic material is choosen, i.e. the material which may stand a higher temperature without melting.

The invention relates also to a method for producing the above described product by which method a porous paper web is fed into the gap between two rollers joining an extruded plastic film in said gap. Said method is characterized in that the paper web and the plastic film are pressed together only within limited areas in that one smooth roller and one profiled roller have been choosen as said rollers.

Practical tests have hereby shown that the working surface of the profiled roller ought to have a coating of a silicone material in order to prevent a sticking of the plastic material which eventually penetrates the paper layer.

The invention is described more in detail in the following referring to the attached drawings, which schematically show a plant for exercising the method according to the invention and some rollers which may be used in connection with said method.

Figure 2:
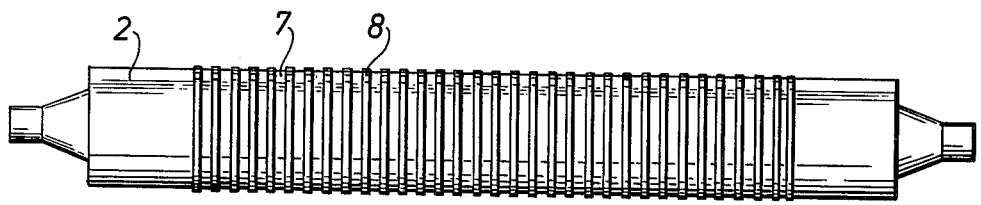
FIG. 2 shows a longitudinal front view of a pressure roller which is a part of the plant according to FIG. 1.
Figure 6:
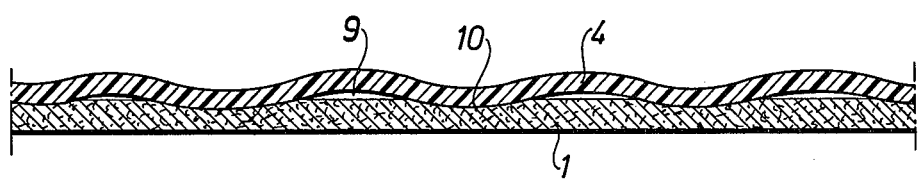
Figure 7:
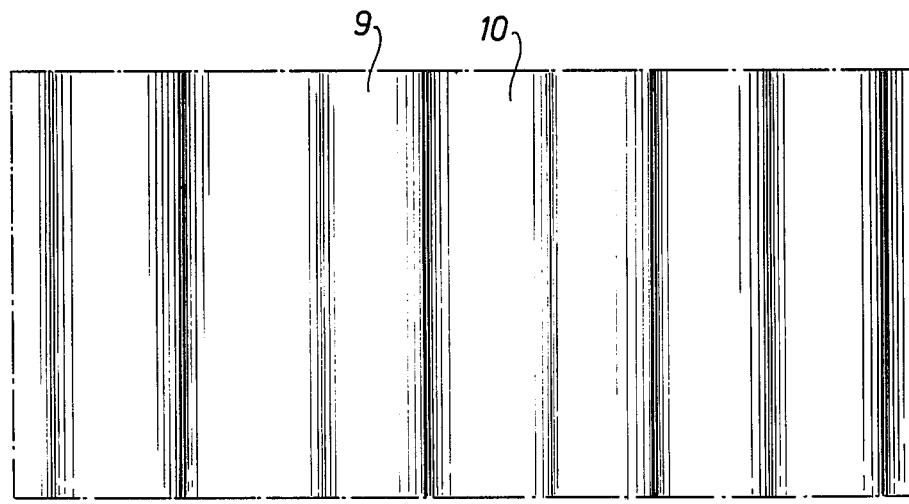

FIGS. 6 and 7 finally show in section and in plan an example of a product produced by means of the pressure roller according to FIG. 2.

Figure 1:
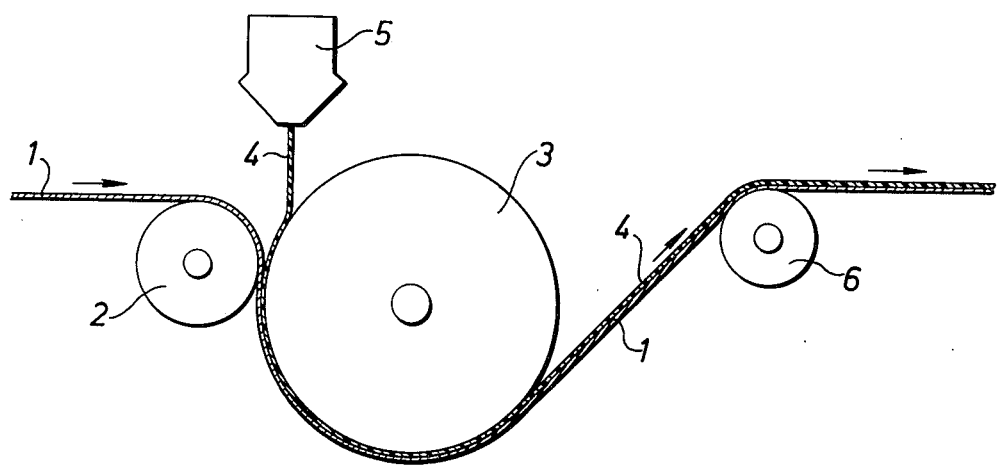
FIG. 1 shows an example a plant which may be used practising the invention.

When the plant according to FIG. 1 is intended to be used for practising the invention a first web of material 1 is fed into the gap between a pressure roller and a cooling roller 3. Preferably said material web 1 is made of a paper layer of a so called tissue-quality, i.e. a porous paper quality with a surface weight of 15-50 grs/sqm. At the same time a plastic film 4 is extruded from the extruder 5. In order to prevent that said plastic film 4 shall be pressed entirely into the porous paper web 1, it is preferably first brought into contact with the cooling roller 3 before it is fed into the gap between the rollers 2 and 3 in order to join the paper layer. The web made of a paper layer 1 joined to the plastic film 4 is thereafter fed over a pulley roller 6 and further to a conventional winding-up-station (not shown). The pressure roller 2 for which alternative forms are shown in FIGS. 2-5 consists preferably of a metal roller, the raised portions of which being provided with a thinn coating of a silicone material. Practical tests have hereby shown that a thickness of about 7 mm is suitable for said coating. The cooling roller 3 on the other hand is preferably a smooth lustry or a dull sand-blasted metal roller for instance.

The pressure roller 2 shown in FIG. 2 has been made by turning out peripheral grooves 7 in its surface, providing peripheral flanges between the grooves 7. At the sections where those flanges 8 press the paper layer 1 and the plastic film 4 against the cooling roller 3 the plastic layer 4 is brought to partly penetrate into the paper layer providing a good attachment. Opposite the grooves 7, i.e. between the flanges 8, no or a very weak attachment is provided.

Figure 3A:
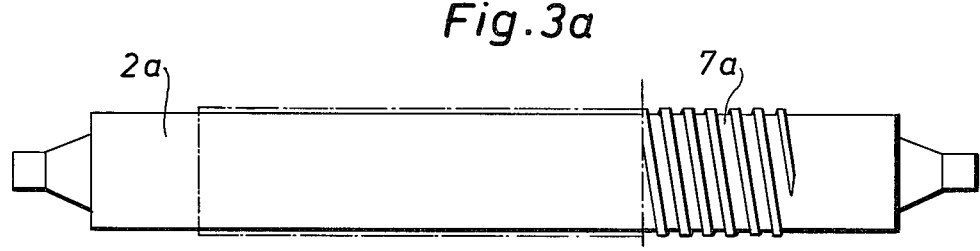
FIGS. 3a and 3b show a longitudinal front view and an end view, respectively, of an alternative form for the pressure roller.
Figure 3B:
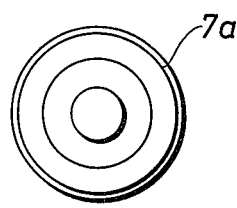

In FIGS 3a and 3b is shown an alternative form for the pressure roller. By said form which here is given the reference numeral 2a the grooves 7 have been replaced by a screw thread 7a. The function of the roller is however the same disregarding that an other design is provided for the sections with and without attachment.

Figure 4:
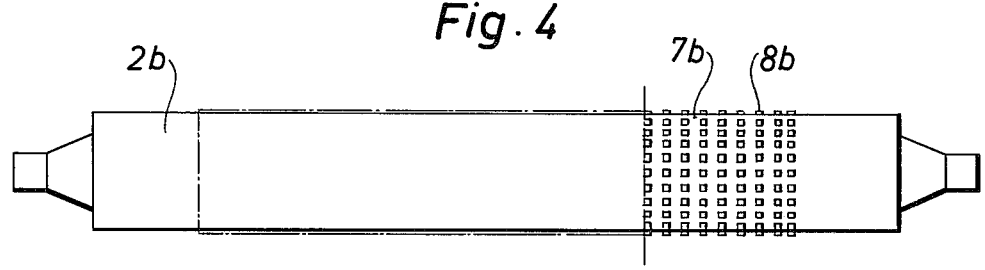
FIGS. 4 and 5 show longitudinal front views of further two alternative forms of the pressure roller.

By the embodiment according to FIG. 4, the pressure roller is given the reference numeral 2b. By this embodiment the grooves 7 is replaced by the grooves 7b. The flanges 8 have on the other hand been replaced by raised portions 8a having a square upper surface. Thanks to this construction the readymade product will get a point-formed design of sections with a good attachment.

Figure 5:
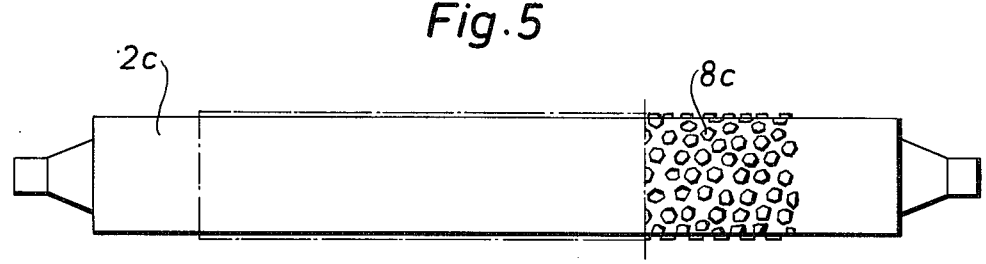

By the embodiment of the pressure roller shown in FIG. 5, which here has been given the reference numeral 2c, the regular design of FIG. 4 has been replaced by a more irregular design of raised portions 8c. Those portions have here been shown having a pentagonal upper surface. For the man skilled in the art it must however be obvious that said form may be varied within wide limits.

FIGS. 6 and 7 show as an example a product produced by means of the pressure roller according to FIG. 2 in the plant according to FIG. 1. In those figures sections 9 having a weak or no attachment (shaded in FIG. 7) are shown somewhat exaggerated alternating with sections 10 having a good attachment. As mentioned above a certain penetration of the plastic layer 4 into the paper layer 1 is provided within the sections 10. This effect has however for the sake of simplicity not been shown in FIG. 6.

The invention is of course not restricted to only the above described embodiments, but may be varied within the scope of the following claims. The method according to the invention may for instance be practised in many different kinds of extruding plants. Furthermore it is possible by somewhat less porous paper qualities to replace the silicone coated pressure roller 2 with a conventional rubber roller. Also the pressure between the two rollers 2 and 3 may be varied. As a matter of principle a less total pressure can be used between the present rollers compared with that used between two smooth rollers. In practise it has furthermore been shown to be suitable to lower the specific surface pressure between the two rollers a little more then what may be motivated only by limited surface contact. Preferably, there is used a surface pressure of about 50-90 % of the pressure used by conventional extruding coating. In spite of such a lowered pressure practical tests have shown a good penetration of the semiliquid plastic into the porous paper layer.

I claim:

1. A method of producing a laminate of a web of porous paper and a layer of thermoplastic material in which the web of porous paper and layer of plastic material are joined at spaced areas to form a soft folding laminate comprising extruding a thermoplastic material in web form onto a smooth, rotating, cool roller, passing a web of porous paper onto the extruded layer of thermoplastic material on the cool roller at a point spaced from the point of contact of said layer of plastic material with the cool roller in the direction of rotation of the roller, passing the web of porous paper and layer of plastic material between the cool roller and a rotating profiled roller for pressing the web of porous paper and a layer of plastic material together at spaced areas determined by the profiled roller, the layer of extruded plastic material being cooled by the cool roller sufficiently to prevent substantial quantities of the plastic material of the layer from migrating entirely through the web of paper at the spaced areas while permitting partial penetration of the extruded plastic layer into the paper web to join the web of paper and layer of plastic material together at spaced areas.

2. A method as claimed in claim 1 wherein the spaced areas comprise parallel spaced lines extending longitudinally of the laminate web.

3. A method as claimed in claim 1 wherein the spaced areas comprise parallel spaced lines extending transversely of the laminate.

4. A method as claimed in claim 1 wherein the spaced areas comprise a grid of spaced lines extending transversely and longitudinally of the laminate.

5. A method as claimed in claim 1 wherein the spaced areas comprise lines extending diagonally across the laminate.

6. A method as claimed in claim 1 wherein the spaced areas comprise a plurality of separate and distinct spaced areas arranged over the laminate, the total area of the distinct, spaced areas comprising about 5-50% of the total area of the laminate.

7. A method as claimed in claim 1 wherein the profiled roller is provided with a layer of silicone material to prevent any plastic material that may entirely penetrate the web of porous paper from adhereing to the profiled roller.

8. A method of producing a laminate of a web of porous paper and a layer of thermoplastic material in which the web of porous paper and layer of thermoplastic material are joined at spaced areas to form a soft folding laminate comprising passing a web of porous paper into the nip between a cooling roller and a pressure roller while simultaneously extruding a layer of a thermoplastic material into the nip between the cooling roller and the web of porous paper, said pressure roller being profiled for pressing the web of porous paper against the layer of extruded thermoplastic material at spaced areas determined by the profiled roller, the temperature of the cooling roller being such that the layer of extruded thermoplastic material will become substantially non-fluent to a depth sufficient to prevent substantial quantities of the thermoplastic material from passing entirely through the web of porous paper while permitting partial penetration of the thermoplastic material into the web of porous paper at the spaced areas.

9. A method as claimed in claim 8 wherein the spaced areas comprise a plurality of separate and distinct spaced areas arranged over the laminate, the total area of the distinct, spaced areas comprising about 5-50% of the total area of the laminate.

10. A method as claimed in claim 8 wherein the profiled roller is provided with a layer of silicon material to prevent any thermoplastic material that may entirely penetrate the web of porous paper from adhering to the profiled roller.

* * * * *